(12) United States Patent
Zhang et al.

(10) Patent No.: US 12,248,517 B2
(45) Date of Patent: Mar. 11, 2025

(54) METHOD, APPARATUS, DEVICE, AND STORAGE MEDIUM FOR DATA PROCESSING OF GRAPH DATABASE

(71) Applicant: Beijing Volcano Engine Technology Co., Ltd., Beijing (CN)

(72) Inventors: Shuai Zhang, Beijing (CN); Yingqian Hu, Beijing (CN); Chao Chen, Beijing (CN); Zhenjie Zhang, Singapore (SG); Hongzhi Chen, Beijing (CN)

(73) Assignee: BEIJING VOLCANO ENGINE TECHNOLOGY CO. LTD., Beijing (CN)

( * ) Notice: Subject to any disclaimer, the term of this patent is extended or adjusted under 35 U.S.C. 154(b) by 0 days.

(21) Appl. No.: 18/658,765

(22) Filed: May 8, 2024

(65) Prior Publication Data
US 2024/0378241 A1    Nov. 14, 2024

(30) Foreign Application Priority Data
May 9, 2023    (CN) .......................... 202310520653.1

(51) Int. Cl.
*G06F 16/901*    (2019.01)
(52) U.S. Cl.
CPC ...... *G06F 16/9024* (2019.01); *G06F 16/9027* (2019.01)
(58) Field of Classification Search
None
See application file for complete search history.

(56) References Cited

U.S. PATENT DOCUMENTS

| | | | |
|---|---|---|---|
| 10,437,804 B1 | 10/2019 | Tsypliaev et al. | |
| 2014/0229496 A1 | 8/2014 | Minami et al. | |
| 2016/0371355 A1* | 12/2016 | Massari | G06F 16/25 |
| 2017/0091246 A1* | 3/2017 | Risvik | G06F 16/2471 |
| 2017/0329871 A1* | 11/2017 | Subramani | G06F 16/51 |
| 2022/0004580 A1 | 1/2022 | Li et al. | |
| 2024/0202179 A1* | 6/2024 | Vallet Glenisson | H03M 7/3066 |

OTHER PUBLICATIONS

Extended European Search Report for European Patent Application No. 24175011.6, mailed on Sep. 19, 2024, 11 pages.
Prout et al., "Cloud-Native Transactions and Analytics in SingleStore", Proceedings of the 2022 International Conference on Management of Data, ACMPUB27, New York, NY, USA, Jun. 10, 2022, 13 pages.

* cited by examiner

*Primary Examiner* — Alex Gofman
*Assistant Examiner* — Umar Mian
(74) *Attorney, Agent, or Firm* — Astute IP Law Group

(57) ABSTRACT

The present disclosure provides a data processing method, apparatus, and device for a graph database, and a storage medium. The method includes: after receiving a writing request for first target graph data, determining a B-tree corresponding to each node in the first target graph data, storing graph data of at least one edge type corresponding to the node into a leaf node of the corresponding B-tree, and storing index information of the leaf node into an internal node corresponding to the leaf node in the B-tree; and determining, in a key-value store system, a key-value pair corresponding to the node in the B-tree, storing an index key of the node into a key of the corresponding key-value pair, and storing the graph data or index information stored in the node into a value of the corresponding key-value pair.

17 Claims, 3 Drawing Sheets

METHOD, APPARATUS, DEVICE, AND STORAGE MEDIUM FOR DATA PROCESSING OF GRAPH DATABASE

CROSS-REFERENCE TO RELATED APPLICATION(S)

This application claims priority to Chinese Application No. 202310520653.1 filed on May 9, 2023, the disclosures of which are incorporated herein by reference in their entities.

FIELD

The present disclosure relates to the field of data processing, and in particular, to method, apparatus, device, and storage medium for data processing of graph database.

BACKGROUND

With the rapid development of big data industries such as social communication, e-commerce, finance, retail, and Internet of Things, a large and complex data relationship network has been created in the real world. Relationships between data that needs to be processed by the big data industry grow in geometrical progression as the amount of data increases. It is difficult for traditional databases to handle relationship operations. There is an urgent need for a database that supports complex data relationship operations. Therefore, a graph database has emerged.

However, an existing graph data processing method for the graph database is not good for reading and writing data of a small number of nodes with a large number of edges. For the above types of graph data, there is a problem of low data reading and writing efficiency.

SUMMARY

In order to solve the above technical problems, embodiments of the present disclosure provide a data processing method for a graph database.

In a first aspect, the present disclosure provides a data processing method for a graph database. The method includes:
  receiving a writing request for first target graph data, wherein the first target graph data includes nodes and edges, and edge types of the edges are used for characterizing relationship types between nodes associated with the edges;
  determining a balanced B-tree corresponding to each node in the first target graph data, storing graph data of at least one edge type corresponding to each node into a leaf node of the corresponding B-tree, and storing index information of the leaf node into an internal node corresponding to the leaf node in the B-tree, wherein the index information of the B-tree is stored at a root node of the B-tree, and the index information of the B-tree is determined based on a node identifier of the node corresponding to the B-tree and the at least one edge type corresponding to the B-tree; and
  determining, in a key-value store system, a key-value pair corresponding to each node in the B-tree, persistently storing an index key in the index information of each node into a key of the corresponding key-value pair, and persistently storing the graph data or the index information stored in each node into a key of the corresponding key-value pair, wherein the key-value store system is configured to persistently store the graph data.

In an alternative implementation, before determining a B-tree corresponding to each node in the first target graph data, the method further includes:
  generating log information corresponding to the writing request, wherein the log information is used for recording operation information of the writing request;
  storing the log information corresponding to the writing request into the key-value store system; and
  in response to determine that the B-tree corresponding to the log information meets a preset first playback condition and/or an idle state of a current system meets a preset second playback condition, obtaining the log information from the key-value store system; and
  determining a B-tree corresponding to each node in the first target graph data respectively includes:
  determining, based on the operation information of the writing request that is recorded in the log information, the B-tree corresponding to each node in the first target graph data corresponding to the operation information.

In an alternative implementation, storing the log information corresponding to the writing request into the key-value store system includes:
  storing the log information corresponding to the writing request into log streams of the B-trees corresponding to the first target graph data in the key-value store system in the form of key-value pairs, wherein the key-value store system stores log streams having mapping relationships with the various B-trees respectively.

In an alternative implementation, after generating log information corresponding to the writing request, the method further includes:
  recording the index information of the B-trees corresponding to the first target graph data in a preset dirty linked list in a cache, wherein the preset dirty linked list is used for maintaining the index information of B-trees with unplayed log information; and
  when the index information of the B-trees corresponding to the first target graph data is obtained from the preset dirty linked list, executing the step of determining that the B-tree corresponding to the log information meets a preset first playback condition and/or an idle state of a current system meets a preset second playback condition.

In an alternative implementation, a plurality of data shards corresponding to a complete set of graph data stored in the key-value store system are respectively stored in caches of different devices; the plurality of data shards is obtained by partitioning the complete set of graph data based on a preset partitioning strategy; and the preset partitioning strategy is determined based on a feature of an application scenario of the complete set of graph data.

In an alternative implementation, the storage capacity of the leaf node of the B-tree is pre-configured based on reading and writing feature information of the graph data stored in the leaf node, and the reading and writing feature information is used for characterizing a requirement of the graph data for data read and write amplification.

In an alternative implementation, the method further includes:
  receiving a reading request for second target graph data through a graph query engine layer, and transmitting the reading request into a graph storage engine layer;
  determining, by using the graph storage engine layer, B-trees corresponding to the reading request based on node identifiers and edge types of various nodes in the second target graph data, executing the reading request based on the B-trees to obtain a reading result, and returning the reading result to the graph query engine layer.

In a second aspect, the present disclosure provides a data processing apparatus for a graph database. The apparatus includes:

a first receiving module, configured to receive a writing request for first target graph data, wherein the first target graph data includes nodes and edges, and edge types of the edges are used for characterizing relationships between nodes associated with the edges;

a first storage module, configured to: determine a balanced B-tree corresponding to each node in the first target graph data, store graph data of at least one edge type corresponding to each node into a leaf node of the corresponding B-tree, and store index information of the leaf node into an internal node corresponding to the leaf node in the B-tree, wherein the index information of the B-tree is stored at a root node of the B-tree, and the index information of the B-tree is determined based on a node identifier of the node corresponding to the B-tree and the at least one edge type corresponding to the B-tree; and a second storage module, configured to: determine, in a key-value store system, a key-value pair corresponding to each node in the B-tree, persistently store an index key in the index information of each node into a key of the corresponding key-value pair, and persistently store the graph data or the index information stored in each node into a key of the corresponding key-value pair, wherein the key-value store system is configured to persistently store the graph data.

In a third aspect, the present disclosure provides a computer-readable storage medium, having instructions stored therein, wherein the instructions, when performed by a terminal device, cause the terminal device to implement the above methods.

In a fourth aspect, the present disclosure provides a data processing device for a graph database, including a memory, a processor, and a computer program stored on the memory and runnable on the processor, wherein the processor, when perform the computer program, implements the above method.

In a fifth aspect, the present disclosure provides a computer program product, wherein the computer program product includes a computer program/instruction, and the computer program/instruction, when executed by a processor, implements the above method.

Compared with the existing technology, the technical solutions provided by the embodiments of the present disclosure at least have the following advantages:

The embodiments of the present disclosure provide a data processing method for a graph database. After a writing request for first target graph data is received, a balanced B-tree corresponding to each node in the first target graph data is determined; graph data of at least one edge type corresponding to each node is stored into a leaf node of the corresponding B-tree; index information of the leaf node is stored into an internal node corresponding to the leaf node in the B-tree, wherein the index information of the B-tree is stored at a root node of the B-tree, and the index information of the B-tree is determined based on a node identifier of the node corresponding to the B-tree and the at least one edge type corresponding to the B-tree; thus, in a key-value store system, a key-value pair corresponding to each node in the B-tree is determined; an index key in the index information of each node is persistently stored into a key of the corresponding key-value pair; and the graph data or the index information stored in each node is persistently into a key of the corresponding key-value pair, wherein the key-value store system is configured to persistently store the graph data. According to the embodiments of the present disclosure, the graph data is organized into a storage structure of the B-tree. Since the storage structure of the B-tree supports efficient and low-delay data reading and writing, a graph database achieved based on the B-tree can also support efficient and low-delay data reading and writing; and particularly for nodes with a large number of edges, the data reading and writing efficiency may be improved to a larger extent.

BRIEF DESCRIPTION OF THE DRAWINGS

The drawings here are incorporated into and form part of the specification, showing the embodiments that comply with the present disclosure, and are used together with the specification to explain the principles of the present disclosure.

In order to describe the technical solutions in the embodiments of the present disclosure or in the related art more clearly, the following briefly introduces the accompanying drawings for describing the embodiments or the related art. Apparently, a person of ordinary skill in the art may still derive other drawings from the accompanying drawings without creative effort.

DETAILED DESCRIPTION OF EMBODIMENTS

Figure 1:
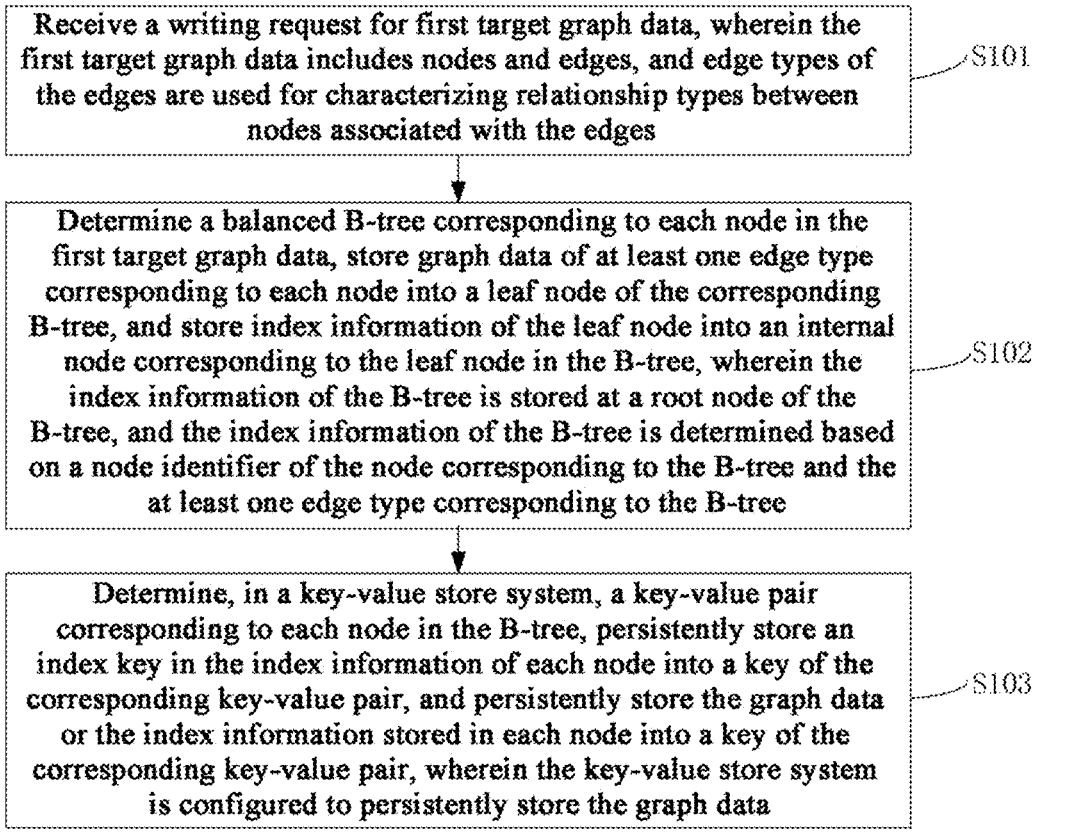
FIG. 1 is a flowchart of a graph data storage method according to an embodiment of the present disclosure.

In order to better understand the above objectives, features, and advantages of the present disclosure, the following will further describe the solutions of the present disclosure. It should be noted that the embodiments of the present disclosure and features in the embodiments may be mutually combined without conflicts.

Many specific details have been elaborated in the following description to facilitate a full understanding of the present disclosure, but the present disclosure can also be implemented in other ways different from those described here. Obviously, the embodiments in the specification are only part of the embodiments of the present disclosure, rather than all the embodiments.

Relationships between data in a big data industry grow in geometrical progression with the increase of the amount of data. Therefore, the big data industry requires databases that can handle complex data relationship operations. A graph database is better at handling the data relationship operations compared with a traditional database.

The graph database is a database that uses a graph structure for semantic query and respectively associates stored data items with sets of nodes and edges. The graph database is a non-relational database that can address the limitation of a traditional relational database. The graph database is used for achieving secure and lossless storage of data, as well as performing associated query, update, control, and organization of data.

The current graph database is usually achieved based on a storage structure that stores a single edge into a single key-value pair or aggregates and stores all adjacent edges of a vertex. Nodes with a large number of edges have a problem of low data reading and writing efficiency. Therefore, according to the embodiments of the present disclosure, the graph data is organized into a storage structure of a B-tree. Since the storage structure of the B-tree supports efficient and low-delay data reading and writing, a graph database achieved based on the B-tree can also support efficient and low-delay data reading and writing; and particularly for nodes with a large number of edges, the data reading and writing efficiency may be improved to a large extent.

B-tree, also referred to as a balanced multi-way search tree, including a root node (root), a leaf node (leaf), and an internal node (internal). The root node refers to a node without a parent node; the leaf node refers to a node without a child node; and the internal node refers to another node in the B-tree except for the root node and the leaf node, and has both a parent node and a child node.

In practical applications, an m-order B-tree (also referred to as an m-tree) may include the following characteristics:

A maximum value of the numbers of child nodes of all nodes in the B-tree is referred to as the order of the B-tree, denoted as M. Each node in the B-tree may have at most M subtrees. To be specific, if the order of the B-tree is set to M, the number of child nodes of any node in the B-tree may not exceed M. If the root node of the B-tree is not a terminal node, there are at least two subtrees. Except for the root node and the leaf node, all the nodes have at least m/2 subtrees, and the like.

To improve the data reading and writing efficiency of the graph database, the embodiments of the present disclosure provide a data processing method for a graph database. After a writing request for first target graph data is received, a balanced B-tree corresponding to each node in the first target graph data is determined; graph data of at least one edge type corresponding to each node is stored into a leaf node of the corresponding B-tree; index information of the leaf node is stored into an internal node corresponding to the leaf node in the B-tree, wherein the index information of the B-tree is stored at a root node of the B-tree, and the index information of the B-tree is determined based on a node identifier of the node corresponding to the B-tree and the at least one edge type corresponding to the B-tree; thus, in a key-value store system, a key-value pair corresponding to each node in the B-tree is determined; an index key in the index information of each node is persistently stored into a key of the corresponding key-value pair; and the graph data or the index information stored in each node is persistently into a key of the corresponding key-value pair, wherein the key-value store system is configured to persistently store the graph data. According to the embodiments of the present disclosure, the graph data is organized into a storage structure of the B-tree. Since the storage structure of the B-tree supports efficient and low-delay data reading and writing, a graph database achieved based on the B-tree may also support efficient and low-delay data reading and writing; and particularly for nodes with a large number of edges, the data reading and writing efficiency may be improved to a large extent.

Based on this, the embodiments of the present disclosure provide a data processing method for a graph database. FIG. 1 shows a flowchart of a data processing method for a graph database according to an embodiment of the present disclosure. The method specifically includes:

S101: Receiving a writing request for first target graph data.

The first target graph data includes nodes and edges, and edge types of the edges are used for characterizing relationship types between nodes associated with the edges.

The embodiments of the present disclosure are applied to a graph database to achieve functions such as reading and writing graph data.

In the embodiments of the present disclosure, the first target graph data may be any graph data to be written. The first target graph data includes the nodes and the edges. Each node is used for characterizing an entity, such as a user in social network data. Each edge is used for characterizing a relationship between corresponding entities, such as a friend relationship and a follow relationship between users in the social network data, and the edge type is used for characterizing a relationship type between nodes with variable associations. For example, the friend relationship belongs to a friend relationship type, and the follow relationship belongs to a follow relationship type.

S102: Determining a balanced B-tree corresponding to each node in the first target graph data; graph data of at least one edge type corresponding to each node is stored into a leaf node of the corresponding B-tree; and index information of the leaf node is stored into an internal node corresponding to the leaf node in the B-tree.

The index information of the B-tree is stored at a root node of the B-tree, and the index information of the B-tree is determined based on a node identifier of the node corresponding to the B-tree and the at least one edge type corresponding to the B-tree.

In the embodiments of the present disclosure, after the writing request for the first target graph data is received, whether B-trees corresponding to the various nodes in the first target graph data exist is determined first. For a node, having a B-tree, in the first target graph data, graph data of at least one edge type corresponding to the node is stored into a leaf node of the corresponding B-tree, and index information of the leaf node is stored into an internal node corresponding to the leaf node in the B-tree.

For a node, having no B-tree, in the first target graph data, a B-tree is constructed for the node, and index information is determined for the B-tree based on a node identifier of the node and an edge type of graph data needing to be stored into the B-tree. For example, a hash algorithm is used to calculate a hash value based on the node identifier and the edge type as the index information of the B-tree. The embodiments of the present disclosure do not limit the specific determination of the index information based on the node identifier of the node corresponding to the B-tree and the at least one edge type corresponding to the B-tree.

Storage structures of B-trees are used to store the graph data. Specifically, each B-tree corresponds to a node, having at least one edge, in the first target graph data. The B-tree is used for storing the graph data of the at least one edge type corresponding to the node. The edge type means a relationship type to which the edges between the nodes in the graph data. For example, the edge type may include a friend relationship type, a follow relationship type, and the like between users in social network data.

In the embodiments of the present disclosure, for a node connected with multiple edges, such as a node corresponding to a big V user in the social network data, the storage structure of the B-tree is used to store the node. Compared with other storage structures, the storage structure of the B-tree can greatly improve the reading and writing efficiency of the data of the nodes of the above type, so as to provide the user with an efficient and low delay data access service.

Figure 2:
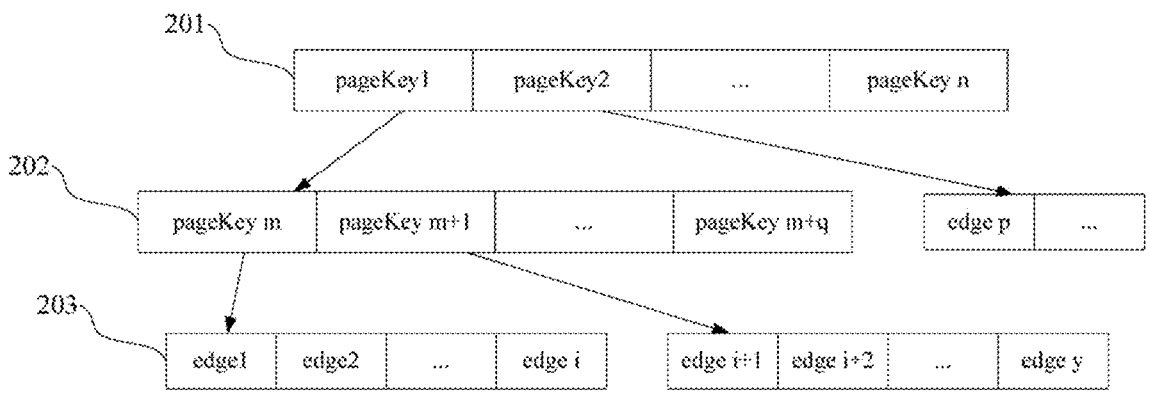
FIG. 2 is a schematic structural diagram of a B-tree according to an embodiment of the present disclosure.

FIG. 2 is a schematic structural diagram of a B-tree according to an embodiment of the present disclosure. A root node 201 of the B-tree is used for storing index information of the B-tree and index information of internal nodes and leaf nodes which are connected to the root node 201. The index information includes index keys such as pageKey 1 to pageKey n. The root node 201 of the B-tree may be indexed based on the index information of the B-tree. Reading and writing operations may be implemented for graph data stored in the various leaf nodes in the B-tree by obtaining the index keys of the various nodes stored in the root node. The index information of the internal node 202 of the B-tree is pageKey 1 stored in the root node. The internal node 202 may be indexed based on pageKey 1. The internal node 202 is used for storing the index information pageKey m of the corresponding leaf node 203. The leaf node 203 of the B-tree may be indexed based on pageKey m. The leaf node 203 is used for storing graph data, such as edge1 to edgei, of at least one edge type corresponding to a first node in the graph data.

In the embodiments of the present disclosure, a first B-tree is taken as an example. The first B-tree may be any B-tree that stores graph data. The index information stored in the root node of the first B-tree may be determined based on a node identifier of a first node and at least one edge type. For example, the index information may be a character string obtained by performing a hash operation on the node identifier and the edge type.

In an alternative implementation, the storage capacity of the leaf node of the B-tree may be pre-configured based on reading and writing feature information of the graph data stored in the leaf node. The storage capacity of the leaf node means a length of graph data that the leaf node can store at most. As shown in FIG. 2, the storage capacity of the leaf node 203 is 10. In addition, the reading and writing feature information is used for characterizing a requirement of the graph data for data read and write amplification.

A higher storage capacity of the leaf node indicates greater writing amplification of the B-tree, and a lower storage capacity of the leaf node indicates greater reading amplification of the B-tree. To seek a balance between the write amplification and the read amplification of the B-tree, the embodiments of the present disclosure provide a user with a custom setting function for the storage capacity of the leaf node of the B-tree. The user may configure the storage capacity of the leaf node of the B-tree based on the reading and writing requirements of the graph data.

S103: In a key-value store system, determining a key-value pair corresponding to each node in the B-tree; an index key in the index information of each node is persistently stored into a key of the corresponding key-value pair; and the graph data or the index information stored in each node is persistently into a key of the corresponding key-value pair, wherein the key-value store system is configured to persistently store the graph data.

In practical applications, disk storage of the graph database is usually implemented based on the key-value (KV) store system. The key-value store system is used to persistently store the graph data. Therefore, in the embodiments of the present disclosure, mapping relationships between all the nodes in the B-tree and all the key-value pairs in the key-value store system to achieve the disk storage of the graph data in the graph database.

In the embodiments of the present disclosure, a node in the B-tree corresponds to a key-value pair in the key value store system. As a B-tree is composed of a plurality of nodes, a B-tree corresponds to a plurality of key-value pairs in the key-value store system. Specifically, the key in each key-value pair is used for storing an index key of the corresponding node in the B-tree, wherein the index key belongs to the index information of the node. The value in each key-value pair is used for storing the graph data or index information stored in the corresponding node in the B-tree.

In practical applications, during the process of the disk storage of the first target graph data, whether the key-value pair corresponding to each node in the various B-trees corresponding to the first target graph data exists in the key-value store system is determined first. A node with the key-value pair existing in the key-value store system may be updated by using the graph data stored in the node in the corresponding B-tree. For a node with the key-value pair not existing in the key-value store system, the key of the key-value pair may be used to persistently store the index information of the node, as well as the value of the same key-value pair may be used to persistently store the graph data or the index information stored in the node.

In an alternative implementation, for a leaf node of the B-tree, the key in the key-value pair, having the mapping relationship with the leaf node, in the key-value store system is used for storing an index key of the leaf node, and the leaf node may be indexed based on the index key, thereby reading the graph data stored in the leaf node. The value in the key-value pair is used for storing the graph data stored in the leaf node.

In another alternative implementation, for an internal node of the B-tree, the key in the key-value pair, having the mapping relationship with the internal node, in the key-value store system is used for storing an index key of the internal node, and the internal node may be indexed based on the index key, thereby reading the index information stored in the internal node. The value in the key-value pair is used for storing the index information stored in the internal node.

In still another alternative implementation, for a root node of the B-tree, the key in the key-value pair, having the mapping relationship with the root node, in the key-value store system is used for storing an index key of the root node, and the root node may be indexed based on the index key, thereby reading the index information stored in the root node. The value in the key-value pair is used for storing the index information stored in the root node.

In the data processing method for the graph database according to the embodiments of the present disclosure, the mapping relationship is established between each node in the B-tree and the key-value pair in the key-value store system for disk storage, and the key-value pair is used to store the index key of the node and the graph data stored in the node, thus achieving the disk storage on the graph database.

In addition, in data processing method for the graph database according to the embodiments of the present disclosure, after a writing request for first target graph data is received, a B-tree corresponding to each node in the first target graph data is determined; graph data of at least one edge type corresponding to each node is stored into a leaf node of the corresponding B-tree; index information of the leaf node is stored into an internal node corresponding to the leaf node in the B-tree, wherein the index information of the B-tree is stored at a root node of the B-tree, and the index information of the B-tree is determined based on a node identifier of the node corresponding to the B-tree and the at least one edge type corresponding to the B-tree; thus, in a key-value store system, a key-value pair corresponding to each node in the B-tree is determined; an index key in the index information of each node is persistently stored into a key of the corresponding key-value pair; and the graph data or the index information stored in each node is persistently into a key of the corresponding key-value pair, wherein the key-value store system is configured to persistently store the graph data. According to the embodiments of the present disclosure, the graph data is organized into a storage structure of the B-tree. Since the storage structure of the B-tree supports efficient and low-delay data reading and writing, a graph database achieved based on the B-tree can also support efficient and low-delay data reading and writing; and particularly for nodes with a large number of edges, the data reading and writing efficiency may be improved to a large extent.

Based on the above embodiments, after the writing request for the graph data is received, a piece of log information may be generated for the writing request. The log information is used for recording operation information of the writing request, and the log information is persistently stored in the key-value store system. For example, the log information may record operation information of writing a piece of graph data into a leaf node.

In the embodiments of the present disclosure, after the log information is generated, the log information may be stored into the key-value store system to achieve the disk storage of the log information.

In an alternative implementation, in the key-value store system, each B-tree has its corresponding log stream. Compared with such a situation that various B-trees correspond to the same log stream, the embodiments of the present disclosure can improve the data reading and writing efficiency. Specifically, in the embodiments of the present disclosure, each piece of log information is stored in the form of a key-value pair in the key-value store system. Specifically, the generated log information is stored into the log stream of the corresponding B-tree.

The key in the key-value pair is used to store the index key of log information. The index key of log information is composed of the identification of the log flow to which the log information belongs and the order identification of the log information in the log flow. The value in the key-value pair is used for storing the log information.

In practical applications, each B-tree has information such as the latest playback time and the number of unplayed logs. The latest playback time is used for recording the last time when the corresponding B-tree plays back the log information to the key-value store system, and the number of unplayed logs is used for recording the number of pieces of log information of the corresponding B-tree that has not been currently played back to the key-value store system. Usually, the log information that has been played back to the key-value store system may be deleted. Therefore, the number of unplayed logs means the number of pieces of log information of the corresponding B-tree currently in the key-value store system. In addition, an idle state of the system is also an alternative setting condition for determining the playback of the log information.

In an alternative implementation, when it is detected that a time interval between the latest playback time of any B-tree and a current time point meets a preset interval value, or when it is detected that the number of unplayed logs corresponding to any B-tree meets a preset number value, or when it is detected that the idle state of the system meets a preset idle condition, the log information of the B-tree may be obtained from the key-value store system. Then, a historical writing request may be played back to the B-tree based on the operation information recorded in the log information to complete data update of the B-tree. After the data update of the B-tree is completed, the corresponding graph data in the key-value store system (i.e. disk storage) is continued to be updated based on the B-tree.

In an alternative implementation, after the writing request for the first target graph data is received, log information corresponding to the writing request is first generated to record operation information of the writing request. The log information corresponding to the writing request is then stored into the key-value store system. In response to determining that the B-tree corresponding to the log information meets a preset first playback condition and/or an idle state of a current system meets a preset second playback condition, the log information is obtained from the key-value store system. The first playback condition may include that the interval between the latest playback time of the B-tree corresponding to the log information and the current time is greater than a preset interval threshold, or that the number of unplayed logs is not less than a preset number threshold. The second playback condition may include that a ratio of idle threads of a current system is greater than a preset ratio, for example, ⅔ of the threads of the current system are in an idle state.

Thus, the B-tree corresponding to each node in the first target graph data corresponding to the operation is determined based on the operation information of the writing request that is recorded in the log information, and the graph data corresponding to each node is stored into the leaf node of the corresponding B-tree; the index information of the leaf node is stored into the internal node, corresponding to the leaf node, in the corresponding B-tree; and the data update of the B-tree is completed. After the data update of the B-tree is completed, the corresponding graph data in the key-value store system (i.e. disk storage) is continued to be updated based on the B-tree to synchronously update the graph data in a magnetic disk.

Based on the above embodiments, the graph data processing method for the graph database in the embodiments of the present disclosure can also support a high-performance multi-level least recently used (LRU) cache, and can support various modes of synchronizing data with the disk storage, such as synchronizing data into the disk storage every time the data is written, or synchronizing data of an internal memory into the disk storage regularly or when the access traffic is low.

Figure 3:
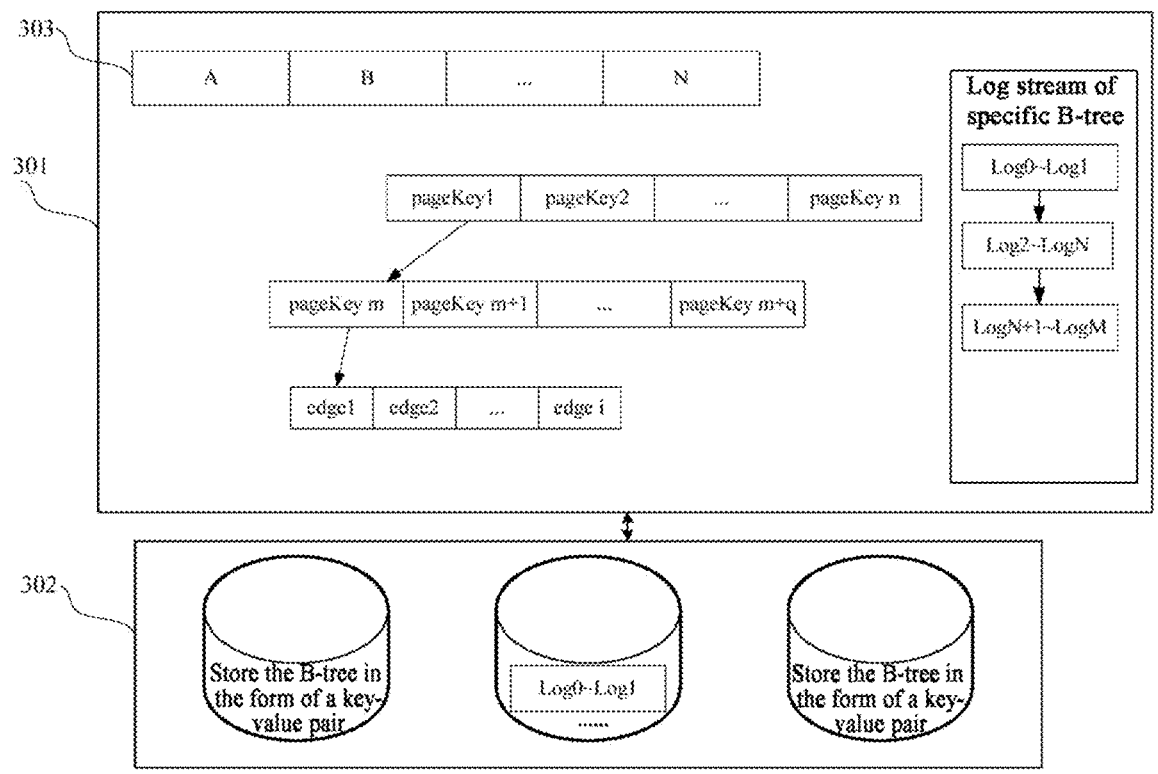
FIG. 3 is a schematic diagram of an architecture of a stand-alone memory engine according to an embodiment of the present disclosure.

For this purpose, the embodiments of the present disclosure provide a stand-alone memory engine. FIG. 3 is a schematic diagram of an architecture of a stand-alone memory engine according to an embodiment of the present disclosure. The stand-alone memory engine 301 is connected to a key-value store system 302 for disk storage to achieve a caching function of a graph database. Specifically, each device connected to the key-value store system may be configured with the aforementioned stand-alone memory engine to cache part or all of graph data (i.e. part or all of B-trees) from the key-value store system.

In an alternative implementation, a complete set of graph data stored in the key-value store system is partitioned into different data shards, and the plurality of data shards corresponding to the complete set of graph data are stored in caches of different devices, such as the stand-alone memory engine as shown in FIG. 3. A partitioning mode for the plurality of data shards is determined based on a preset partitioning strategy. Specifically, the preset partitioning strategy is determined based on features of an application scenario of the complete set of graph data.

Assuming that the complete set of graph data stored in the key-value store system belongs to a knowledge graph scenario, the preset partitioning strategy may be a hash partitioning strategy based on an edge type. Specifically, in hash partitioning based on the edge type, the graph data of the same edge type is classified to the same data shard, so that it is convenient to store the graph data to the cache of the same device, thereby reducing the number of fan-out queries in graph data querying and reducing the query response delay. Assuming that the complete set of graph data stored in the key-value store system belongs to a social scenario, the preset partitioning strategy may be an offline social hashing algorithm, or the like.

In addition, the stand-alone memory engine shown in FIG. 3 above is configured with a preset dirty linked list 303, also referred to as dirty list. The dirty list is used for maintaining the index information of B-trees with unplayed log information. To be specific, the dirty list records the index information of B-trees that have inconsistent data in an internal memory and a magnetic disk, such as index information A, B, and N, so that when a preset condition is met, the index information is used for updating the data in the key-value store system.

In an alternative implementation, after the writing request for the first target graph data is received, log information corresponding to the writing request is generated, such as "a log stream of a specific B-tree" shown in FIG. 3, and the log information is stored into the key-value store system. In addition, since the B-tree corresponding to the log information has inconsistent data in the internal memory and the magnetic disk, the index information of the root node of the B-tree corresponding to the first target graph data may alternatively be recorded in the preset dirty linked list in the cache for subsequent use to update data in the key-value store system.

In practical applications, after the index information of the B-tree corresponding to the first target graph data is obtained from the preset dirty linked list, whether the B-tree meets the preset first playback condition and/or whether the idle state of the current system meets the preset second playback condition can also be determined. If it is determined that the B-tree meets the preset first playback condition or the idle state of the current system meets the preset second playback condition, the log information of the B-tree is obtained from the key-value store system based on the index information of the B-tree to update the graph data stored in the key-value store system.

In practical applications, in response to determining that a preset condition is met currently, for example, when a data update cycle or low current access traffic is met, the index information of the B-tree may be obtained from the preset dirty linked list in the cache, and the log information of the B-tree may be obtained from the key-value store system based on the index information, so that the graph data in the key-value store system may be updated based on the log information, achieving the persistent storage of the data into the disk. In addition, after the data update of the current round is completed, the corresponding log information may also be deleted.

In addition, in the embodiments of the present disclosure, a query function and a storage function of the graph database may be respectively achieved using independent components. To be specific, the query function and the storage function in the graph database are decoupled, so that when there is an expansion requirement (if the access flow changes greatly) for the graph database, the query function or the storage function may be expanded alone, avoiding a waste of resources.

In an alternative implementation, the graph database in the embodiments of the present disclosure may include a graph storage engine layer and a graph query engine layer. The graph query engine layer is used for receiving a graph data reading request from a user to achieve a graph data query function.

In the embodiments of the present disclosure, after a reading request for second target graph data is received through the graph query engine layer, the reading request is transmitted into the graph storage engine layer; the graph storage engine layer is then used to determine B-trees corresponding to the reading request based on node identifiers and edge types of various nodes in the second target graph data, and the reading request is executed based on the B-trees to obtain a reading result; and the reading result is returned to the graph query engine layer to complete the processing of the reading request on the graph data.

Figure 4:
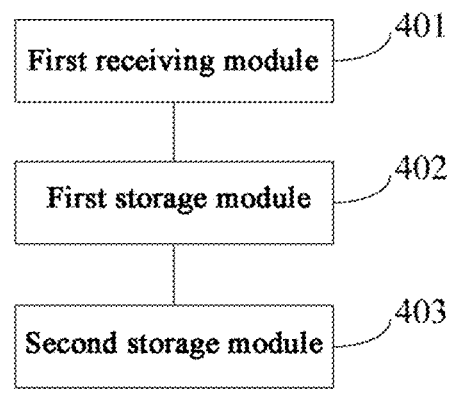
FIG. 4 is a schematic structural diagram of a graph data storage apparatus according to an embodiment of the present disclosure.

Based on the above method embodiment, the present disclosure further provides a data processing apparatus for a graph database. FIG. 4 is a schematic structural diagram of a data processing apparatus for a graph database according to an embodiment of the present disclosure. The apparatus includes:

a first receiving module 401, configured to receive a writing request for first target graph data, wherein the first target graph data includes nodes and edges, and edge types of the edges are used for characterizing relationships between nodes associated with the edges;

a first storage module 402, configured to: determine a balanced B-tree corresponding to each node in the first target graph data, store graph data of at least one edge type corresponding to each node into a leaf node of the corresponding B-tree, and store index information of the leaf node into an internal node corresponding to the leaf node in the B-tree, wherein the index information of the B-tree is stored at a root node of the B-tree, and the index information of the B-tree is determined based on a node identifier of the node corresponding to the B-tree and the at least one edge type corresponding to the B-tree; and a second storage module 403, configured to determine, in a key-value store system, a key-value pair corresponding to each node in the B-tree, persistently store an index key in the index information of each node into a key of the corresponding key-value pair, and persistently store the graph data or the index information stored in each node into a key of the corresponding key-value pair, wherein the key-value store system is configured to persistently store the graph data.

In an alternative implementation, the apparatus further includes:

a first generation module, configured to generate log information corresponding to the writing request, wherein the log information is used for recording operation information of the writing request;

a third storage module, configured to store the log information corresponding to the writing request into the key-value store system; and a first obtaining module, configured to in response to determining that the B-tree corresponding to the log information meets a preset first playback condition and/or an idle state of a current system meets a preset second playback condition, obtain the log information from the key-value store system.

Correspondingly, the first storage module is specifically used to:

determine, based on the operation information of the writing request that is recorded in the log information, the B-tree corresponding to each node in the first target graph data corresponding to the operation information.

In an alternative implementation, the third storage module is specifically used to:

store the log information corresponding to the writing request into log streams of the B-trees corresponding to the first target graph data in the key-value store system in the form of key-value pairs, wherein the key-value store system stores log streams having mapping relationships with the various B-trees respectively.

In an alternative implementation, the apparatus further includes:

a recording module, configured to record the index information of the B-trees corresponding to the first target graph data in a preset dirty linked list in a cache, wherein the preset dirty linked list is used for maintaining the index information of B-trees with unplayed log information; and a first determining module, configured to when the index information of the B-trees corresponding to the first target graph data is obtained from the preset dirty linked list, execute the operation of determining that the B-tree corresponding to the log information meets a preset first playback condition and/or an idle state of a current system meets a preset second playback condition.

In an alternative implementation, a plurality of data shards corresponding to a complete set of graph data stored in the key-value store system are respectively stored in caches of different devices; the plurality of data shards is obtained by partitioning the complete set of graph data based on a preset partitioning strategy; and the preset partitioning strategy is determined based on a feature of an application scenario of the complete set of graph data.

In an alternative implementation, the storage capacity of the leaf node of the B-tree is pre-configured based on reading and writing feature information of the graph data stored in the leaf node, and the reading and writing feature information is used for characterizing a requirement of the graph data for data read and write amplification.

In an alternative implementation, the apparatus further includes:

a second receiving module, configured to: receive a reading request for second target graph data through a graph query engine layer, and transmit the reading request into a graph storage engine layer;

a second determining module, configured to: determine, by using the graph storage engine layer, B-trees corresponding to the reading request based on node identifiers and edge types of various nodes in the second target graph data, execute the reading request based on the B-trees to obtain a reading result, and return the reading result to the graph query engine layer.

In the data processing apparatus for the graph database according to the embodiments of the present disclosure, after a writing request for first target graph data is received, a balanced B-tree corresponding to each node in the first target graph data is determined; graph data of at least one edge type corresponding to each node is stored into a leaf node of the corresponding B-tree; index information of the leaf node is stored into an internal node corresponding to the leaf node in the B-tree, wherein the index information of the B-tree is stored at a root node of the B-tree, and the index information of the B-tree is determined based on a node identifier of the node corresponding to the B-tree and the at least one edge type corresponding to the B-tree; thus, in a key-value store system, a key-value pair corresponding to each node in the B-tree is determined; an index key in the index information of each node is persistently stored into a key of the corresponding key-value pair; and the graph data or the index information stored in each node is persistently into a key of the corresponding key-value pair, wherein the key-value store system is configured to persistently store the graph data. According to the embodiments of the present disclosure, the graph data is organized into a storage structure of the B-tree. Since the storage structure of the B-tree supports efficient and low-delay data reading and writing, a graph database achieved based on the B-tree can also support efficient and low-delay data reading and writing; and particularly for nodes with a large number of edges, the data reading and writing efficiency may be improved to a large extent.

In addition to the above method and apparatus, the embodiments of the present disclosure further provide a computer-readable storage medium having instructions stored therein. The instructions, when executed on a terminal device, cause the terminal device to implement the data processing method for the graph database according to the embodiments of the present disclosure.

The embodiments of the present disclosure further provide a computer program product. The computer program product includes a computer program/instruction, and the computer program/instruction, when executed by a processor, implements the data processing method for the graph database according to the embodiments of the present disclosure.

Figure 5:
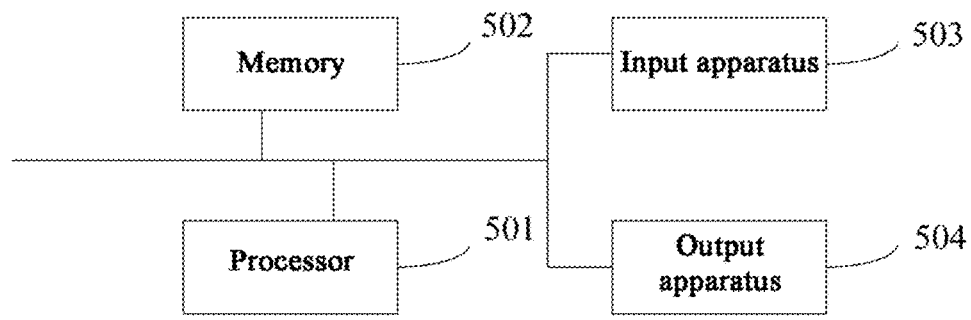
FIG. 5 is a schematic structural diagram of a graph data storage device according to an embodiment of the present disclosure.

In addition, the embodiments of the present disclosure further provide a data processing device for a graph database. Referring to FIG. 5, the device may include:

a processor 501, a memory 502, an input apparatus 503, and an output apparatus 504. A quantity of the processor 501 in the data processing device for the graph database may be one or more. By way of example, FIG. 5 shows one processor. In some embodiments of the present disclosure, the processor 501, the memory 502, the input apparatus 503, and the output apparatus 504 may be connected through a bus or in another way. By way of example, FIG. 5 shows bus connection.

The memory 502 may be configured to store software programs and modules. The processor 501 runs the software programs and modules stored in the memory 502, so as to implement various functional applications and data processing of the data processing device for the graph database. The memory 502 may mainly include a program storage region and a data storage region. The program storage region may store an operating system, an application program required by at least one function, and the like. In addition, the memory 502 may include a high speed random access memory, and may further include a non-volatile memory, such as at least one magnetic disk storage device, a flash memory, or another volatile solid storage device. The input apparatus 503 may be configured to receive input numeric or character information and generate signal inputs related to user settings and function control of the data processing device for the graph database.

Specifically, in this embodiment, the processor 501 may load, according to the following instructions, executable files corresponding to processes of one or more application programs into the memory 502. The processor 501 runs the application programs stored in the memory 502, to implement the various functions of the data processing device for the graph database.

It should be noted that in this document, relationship terms such as "first" and "second" are used solely to distinguish one entity or operation from another entity or operation without necessarily requiring or implying any actual such relationship or order between such entities or operations. Furthermore, the terms "include", "including", or any other variation thereof, are intended to encompass a non-exclusive inclusion, such that a process, method, article, or device that includes a list of elements does not include only those elements but may include other elements not explicitly listed or inherent to such process, method, article, or device. Without further limitation, an element defined by the phrase "including a/an . . . " does not exclude the presence of other identical elements in the process, method, article or device that includes the element.

The above only describes the specific implementations of the present disclosure, which enables those skilled in the art to understand or implement the present disclosure. The various modifications to these embodiments will be apparent to those skilled in the art, and the general principles defined herein may be implemented in other embodiments without departing from the spirit or scope of the present disclosure. Thus, the present disclosure is not limited to these embodiments shown herein, but accords with the broadest scope consistent with the principles and novel features disclosed herein.

We claim:

1. A data processing method for a graph database, wherein the method comprises:
   receiving a writing request for first target graph data, wherein the first target graph data comprises nodes and edges, and edge types of the edges are used for characterizing relationship types between nodes associated with the edges;
   determining a balanced B-tree corresponding to each node in the first target graph data, storing graph data of at least one edge type corresponding to each node into a leaf node of a B-tree, and storing index information of the leaf node into an internal node corresponding to the leaf node in the B-tree, wherein index information of the B-tree is stored at a root node of the B-tree, and the index information of the B-tree is determined based on a node identifier of the node corresponding to the B-tree and the at least one edge type corresponding to the B-tree; and
   determining, in a key-value store system, a key-value pair corresponding to each node in the B-tree, persistently storing an index key in the index information of each node into a key of the corresponding key-value pair, and persistently storing the graph data or the index information stored in each node into a key of the corresponding key-value pair, wherein the key-value store system is configured to persistently store the graph data;
   wherein before determining a B-tree corresponding to each node in the first target graph data, the method further comprises:
   generating log information corresponding to the writing request wherein the log information is used for recording operation information of the writing request;
   storing the log information corresponding to the writing request into the key-value store system; and
   in response to determine that a B-tree corresponding to the log information meets a preset first playback condition and/or an idle state of a current system meets a preset second playback condition, obtaining the log information from the key-value store system; and
   determining a B-tree corresponding to each node in the first target graph data respectively comprises:
   determining, based on the operation information of the writing request that is recorded in the log information, the B-tree corresponding to each node in the first target graph data corresponding to the operation information.

2. The method of claim 1, wherein storing the log information corresponding to the writing request into the key-value store system comprises:
   storing the log information corresponding to the writing request into log streams of the B-trees corresponding to the first target graph data in the key-value store system in the form of key-value pairs, wherein the key-value store system stores log streams having mapping relationships with the various B-trees respectively.

3. The method of claim 1, wherein after generating log information corresponding to the writing request, the method further comprises:
   recording the index information of the B-trees corresponding to the first target graph data in a preset dirty linked list in a cache, wherein the preset dirty linked list is used for maintaining the index information of B-trees with unplayed log information; and
   in response to the index information of the B-trees corresponding to the first target graph data is obtained from the preset dirty linked list, determining that the B-tree corresponding to the log information meets a preset first playback condition and/or an idle state of a current system meets a preset second playback condition.

4. The method of claim 1, wherein a plurality of data shards corresponding to a complete set of graph data stored in the key-value store system are respectively stored in caches of different devices; the plurality of data shards is obtained by partitioning the complete set of graph data based on a preset partitioning strategy; and the preset partitioning strategy is determined based on a feature of an application scenario of the complete set of graph data.

5. The method of claim 1, wherein a storage capacity of the leaf node of the B-tree is pre-configured based on reading and writing feature information of the graph data stored in the leaf node, and the reading and writing feature information is used for characterizing a requirement of the graph data for data read and write amplification.

6. The method of claim 1, wherein the method further comprises:
   receiving a reading request for second target graph data through a graph query engine layer, and transmitting the reading request into a graph storage engine layer;
   determining, by using the graph storage engine layer, B-trees corresponding to the reading request based on node identifiers and edge types of various nodes in the second target graph data, executing the reading request based on the B-trees to obtain a reading result, and returning the reading result to the graph query engine layer.

7. A non-transitory computer-readable storage medium, having instructions stored therein, wherein the instructions, when performed by a terminal device, cause the terminal device to implement a method, comprising:
   receiving a writing request for first target graph data, wherein the first target graph data comprises nodes and edges, and edge types of the edges are used for characterizing relationship types between nodes associated with the edges;

determining a balanced B-tree corresponding to each node in the first target graph data, storing graph data of at least one edge type corresponding to each node into a leaf node of a B-tree, and storing index information of the leaf node into an internal node corresponding to the leaf node in the B-tree, wherein the index information of the B-tree is stored at a root node of the B-tree, and the index information of the B-tree is determined based on a node identifier of the node corresponding to the B-tree and the at least one edge type corresponding to the B-tree; and determining, in a key-value store system, a key-value pair corresponding to each node in the B-tree, persistently storing an index key in the index information of each node into a key of the corresponding key-value pair, and persistently storing the graph data or the index information stored in each node into a key of the corresponding key-value pair, wherein the key-value store system is configured to persistently store the graph data;

wherein before determining a B-tree corresponding to each node in the first target graph data, the method further comprises:

generating log information corresponding to the writing request, wherein the log information is used for recording operation information of the writing request;

storing the log information corresponding to the writing request into the key-value store system; and in response to determine that a B-tree corresponding to the log information meets a preset first playback condition and/or an idle state of a current system meets a preset second playback condition, obtaining the log information from the key-value store system; and determining a B-tree corresponding to each node in the first target graph data respectively comprises:

determining, based on the operation information of the writing request that is recorded in the log information, the B-tree corresponding to each node in the first target graph data corresponding to the operation information.

8. The non-transitory computer-readable storage medium of claim 7, wherein storing the log information corresponding to the writing request into the key-value store system comprises:

storing the log information corresponding to the writing request into log streams of the B-trees corresponding to the first target graph data in the key-value store system in the form of key-value pairs, wherein the key-value store system stores log streams having mapping relationships with the various B-trees respectively.

9. The non-transitory computer-readable storage medium of claim 7, wherein after generating log information corresponding to the writing request, the method further comprises:

recording the index information of the B-trees corresponding to the first target graph data in a preset dirty linked list in a cache, wherein the preset dirty linked list is used for maintaining the index information of B-trees with unplayed log information; and in response to the index information of the B-trees corresponding to the first target graph data is obtained from the preset dirty linked list, determining that the B-tree corresponding to the log information meets a preset first playback condition and/or an idle state of a current system meets a preset second playback condition.

10. The non-transitory computer-readable storage medium of claim 7, wherein a plurality of data shards corresponding to a complete set of graph data stored in the key-value store system are respectively stored in caches of different devices; the plurality of data shards is obtained by partitioning the complete set of graph data based on a preset partitioning strategy; and the preset partitioning strategy is determined based on a feature of an application scenario of the complete set of graph data.

11. The non-transitory computer-readable storage medium of claim 7, wherein a storage capacity of the leaf node of the B-tree is pre-configured based on reading and writing feature information of the graph data stored in the leaf node, and the reading and writing feature information is used for characterizing a requirement of the graph data for data read and write amplification.

12. The non-transitory computer-readable storage medium of claim 7, wherein the method further comprises:

receiving a reading request for second target graph data through a graph query engine layer, and transmitting the reading request into a graph storage engine layer;

determining, by using the graph storage engine layer, B-trees corresponding to the reading request based on node identifiers and edge types of various nodes in the second target graph data, executing the reading request based on the B-trees to obtain a reading result, and returning the reading result to the graph query engine layer.

13. A data processing device for a graph database, comprising a memory, a processor, and a computer program stored on the memory and runnable on the processor, wherein the processor, when perform the computer program, implements a method comprising:

receiving a writing request for first target graph data, wherein the first target graph data comprises nodes and edges, and edge types of the edges are used for characterizing relationship types between nodes associated with the edges;

determining a balanced B-tree corresponding to each node in the first target graph data, storing graph data of at least one edge type corresponding to each node into a leaf node of a B-tree, and storing index information of the leaf node into an internal node corresponding to the leaf node in the B-tree, wherein index information of the B-tree is stored at a root node of the B-tree, and the index information of the B-tree is determined based on a node identifier of the node corresponding to the B-tree and the at least one edge type corresponding to the B-tree; and determining, in a key-value store system, a key-value pair corresponding to each node in the B-tree, persistently storing an index key in the index information of each node into a key of the corresponding key-value pair, and persistently storing the graph data or the index information stored in each node into a key of the corresponding key-value pair, wherein the key-value store system is configured to persistently store the graph data;

wherein before determining a B-tree corresponding to each node in the first target graph data, the method further comprises:

generating log information corresponding to the writing request, wherein the log information is used for recording operation information of the writing request;

storing the log information corresponding to the writing request into the key-value store system; and in response to determine that a B-tree corresponding to the log information meets a preset first playback condition and/or an idle state of a current system meets a preset second playback condition, obtaining the log information from the key-value store system; and determining a B-tree corresponding to each node in the first target graph data respectively comprises:

determining based on the operation information of the writing request that is recorded in the log information, the B-tree corresponding to each node in the first target graph data corresponding to the operation information.

14. The device of claim 13, wherein storing the log information corresponding to the writing request into the key-value store system comprises:

storing the log information corresponding to the writing request into log streams of the B-trees corresponding to the first target graph data in the key-value store system in the form of key-value pairs, wherein the key-value store system stores log streams having mapping relationships with the various B-trees respectively.

15. The device of claim 13, wherein after generating log information corresponding to the writing request, the method further comprises:

recording the index information of the B-trees corresponding to the first target graph data in a preset dirty linked list in a cache, wherein the preset dirty linked list is used for maintaining the index information of B-trees with unplayed log information; and in response to the index information of the B-trees corresponding to the first target graph data is obtained from the preset dirty linked list, determining that the B-tree corresponding to the log information meets a preset first playback condition and/or an idle state of a current system meets a preset second playback condition.

16. The device of claim 13, wherein a plurality of data shards corresponding to a complete set of graph data stored in the key-value store system are respectively stored in caches of different devices; the plurality of data shards is obtained by partitioning the complete set of graph data based on a preset partitioning strategy; and the preset partitioning strategy is determined based on a feature of an application scenario of the complete set of graph data.

17. The device of claim 13, wherein a storage capacity of the leaf node of the B-tree is pre-configured based on reading and writing feature information of the graph data stored in the leaf node, and the reading and writing feature information is used for characterizing a requirement of the graph data for data read and write amplification.

* * * * *